(12) United States Patent
Hecht et al.

(10) Patent No.: US 6,403,900 B2
(45) Date of Patent: Jun. 11, 2002

(54) COMPACT STEERING COLUMN MODULE

(75) Inventors: Walter Hecht, Bietigheim-Bissingen; Rudolf Klein, Lauffen; Jürgen Papenfuss, Sachsenheim; Christian Ruetz, Ludwigsburg; Gregor Vogl, Lauffen, all of (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 09/912,334

(22) Filed: Jul. 26, 2001

Related U.S. Application Data (63) Continuation-in-part of application No. 09/214,767, filed on May 24, 1999, now abandoned.

(51) Int. Cl.⁷ .................................................. H01H 9/00
(52) U.S. Cl. .................................................. 200/61.54
(58) Field of Search ................ 200/61.27, 61.54–61.57; 309/9.1, 10.1, 10.7

(56) References Cited

U.S. PATENT DOCUMENTS

| | | | |
|---|---|---|---|
| 4,743,883 A | * 5/1988 | Yoshimi et al. ........... 340/52 R |
| 5,396,106 A | * 3/1995 | Chretien et al. ........... 307/10.1 |
| 5,780,796 A | * 7/1998 | Uchiyama et al. ....... 200/61.54 |
| 5,895,899 A | * 4/1999 | Sano ....................... 200/61.54 |
| 5,977,494 A | * 11/1999 | Sano et al. ............. 200/61.54 |
| 5,977,495 A | * 11/1999 | Akimoto .................. 200/61.54 |
| 6,025,565 A | * 2/2000 | Miyase et al. ........... 200/61.28 |

* cited by examiner

*Primary Examiner*—Michael Friedhofer
(74) *Attorney, Agent, or Firm*—Paul Vincent (57) ABSTRACT

The invention concerns a modular steering column mounted switch system for motor vehicles which is organized according to the internal functions of the switch. The steering column mounted switch system contains a plurality of functional modules which correspond to the internal functions. Should the demands for operation and/or design of a particular module change, the associated module can be easily replaced. All other functional modules remain unchanged, to thereby permit simple adaptation of the steering column mounted switch to the given operation and design demands. When there is a defect, the modular steering column mounted switch can also be easily repaired and in an economical fashion by simple replacing the defective functional module.

10 Claims, 7 Drawing Sheets

COMPACT STEERING COLUMN MODULE

This application is a continuation-in-part of application Ser. No. 09/214,767 filed May 24, 1999, now abandoned, and is related to DE 199 33 048.4 filed Jul. 15, 1999, the complete disclosure of which are hereby incorporated by reference.

BACKGROUND OF THE INVENTION

The invention relates to a modular steering column mounted switch system for a motor vehicle.

Modular steering column mounted switches are disclosed in DE 2,810,790 and WO 95/13936. These steering column mounted switches have a modular construction which is defined by the technical requirements of assembly or of installation in a vehicle or which has a modularity determined by the external functions to be executed by the switch, such as operation of the light systems or of the window washing systems. The modularity does not reflect a division dictated by the different internal functions of the switch, such as the reception of external mechanical signals, the processing of internal mechanical signals, the mechanical switching of electrical switches, and/or the electrical switching and control of load current and of control current. These various internal functions of the switch assemblies are all integrated in a single module. Requisite electrical subassemblies for the switching and control of load and control currents, the switches and mechanical components for external operation of the switch functions as well as the current terminal connections to the external assemblies which are to be controlled (lights, blinkers, signal horn etc.) are combined, to the greatest possible extent, into one single module. In these conventional steering column mounted switches, failure of one internal function disadvantageously causes the overall module to be defective and to require replacement. In addition, a specific modification of the switch system to the functional needs and design requirements of certain motor vehicles cannot be realized by only changing the components and assemblies that are affected, rather the entire module must be reconfigured.

In view of these deficiencies in prior art, it is the purpose of the present invention to introduce a steering column mounted switch which is more economical to produce and to repair.

SUMMARY OF THE INVENTION

This purpose is achieved in accordance with the present invention with a steering column mounted switch having modules which are configured and assembled in accordance with functional and design requirements and which may be individually replaced in case of defect.

The modular construction of the switch in accordance with the invention is therefore defined by its internal functions. These internal functions of the switch include the accommodation of functional subassemblies and their mounting to the steering column, the receiving and processing of external mechanical signals as well as the switching and control of internal electrical signals. The inventive structure facilitates flexibility in functional group combinations as required by the application. The subdivision of the inventive switch into modules according to function makes repair and maintenance considerably more economical since only defective parts must be replaced. In addition, manufacture is considerably more economical since higher piece counts can be produced.

In accordance with the invention, the different functions required of a steering column mounted switch are consistently assigned to separate individual modules which are detachable from each other and which, when assembled, form the entire switch. For example, one or more modules may be provided which have mechanical functions only to convert the manual operation of the driver (e.g. twisting or turning with respect to the steering column) into a corresponding mechanical movement of a switch member. The at least one mechanical module cooperates with at least one additional module which substantially performs electrical functions only such as electrical connections and optionally electrical amplification and filtering. There is therefore a clearly separated boundary between mechanical and electrical operations. These functions are then combined via interfaces between the corresponding modules. A module may also be provided which exclusively serves to anchor the other modules to the steering column in a simple way. Such a module therefore serves to receive functional subassemblies and to mount them to the steering column. Another module may also be provided which performs a measuring function, e.g. measuring the turning angle of the steering wheel and, consequently, of the steering column relative to the retaining case of the steering column, wherein the steering column mounted switch is mounted to that retaining case.

When a desired change is performed on a switch, this is usually directed to a certain function. For example, it is possible that only the external design of a switch lever module is to be changed or adapted to the spatial conditions of a new type of motor vehicle. In this event, only the associated module or modules must be modified and the construction of the module having the electrical circuit connections need not be changed. In addition, a module which carries electrical circuits may be furnished having built-in auxiliary features to enable new switching functions in conjunction with the insertion of a corresponding mechanical module to e.g. convert switching movements made by the driver into corresponding contact changes on the electrical module (electric board).

Conversely, certain mechanical movements of a shift lever may be assigned new electrical functions. In this case, only an electrical module must be replaced while the mechanical module(s) may remain unchanged. By changing the mounting module used to mount all of the other modules to the steering column housing, a switch can be adapted to different housings and, consequently, to different types of motor vehicles with the remainder of the switch advantageously remaining unchanged. The invention is therefore particularly well suited for adapting a switch to new electrical or mechanical requirements, since only one of the corresponding modules must be replaced. This is also the case in the event that new technical developments are to be incorporated.

In a preferred embodiment in accordance with the invention, the steering column module has a signal transmission case for transmitting information and/or electric currents between the steering wheel and the motor vehicle, with a steering angle sensor comprising a first evaluation electronics, at least one steering column switch and at least one second evaluation electronics for the signal transmission case and/or the steering column switch(es), wherein the first evaluation electronics and the second evaluation electronics are disposed close to one another.

This preferred embodiment reduces the space requirements for the steering column module. This is of great importance for future automotive development since the specifications of automobile manufactures have become more and more restrictive with respect to available space. A further advantage of this embodiment is that the plug paths required for contacting the different units of the steering column module are reduced, thereby facilitating assembly and reducing the likeliness of assembly errors. This produces improved operational safety of the steering column module and improved reliability of the electronics. Moreover, the complete steering column module can be assembled and its function tested outside of the vehicle.

A first variation of this embodiment of the invention provides that the first evaluation electronics and the second evaluation electronics are disposed between the signal transmission case and the steering column switch to save space substantially in the region of the steering column module facing away from the steering wheel of the vehicle.

An alternative to this variation provides that the first evaluation electronics and the second evaluation electronics are integrated in the steering angle sensor. This saves additional space and reduces the number of units.

Another variation of this preferred embodiment provides that the first evaluation electronics and the second evaluation electronics are disposed on a common printed circuit board. This facilitates production of the first and second evaluation electronics and its assembly in the steering column module and also further improves the reliability of the electronics.

In a further alternative, an electric plug connection is provided between the signal transmission case and the second evaluation electronics, wherein their assembly also establishes the electric contacts.

According to an advantageous variation of the preferred embodiment of the invention, one electric plug connection is provided between each steering column switch and the second evaluation electronics, wherein assembly also establishes electric contact among these units.

In a further alternative, the steering angle sensor is disposed between the signal transmission case and steering column switch, wherein the plug paths are particularly short.

In accordance with a further variation, the signal transmission case comprises a part which can be rotated with the steering wheel of the automotive vehicle, wherein the steering angle sensor comprises a code disc which is rotatably disposed in the steering angle sensor, and the code disc is connected for secure rotation with the rotary part of the signal transmission case. Displacement of the code disc from the signal transmission case to the steering angle sensor leaves—with identical outer dimensions—more space for one or two broad-band cables to transfer the signals and electric currents from the steering wheel to the vehicle and vice versa. This is important, in particular for modern vehicles since more and more functions are performed from the steering wheel.

In another alternative, the first steering column switch operates the blinker and includes a blinker return position, wherein the blinker return position can be controlled by the steering angle sensor. In this manner, the steering column module can function prior to installation in the vehicle and that function can be checked before assembly.

Further advantages and advantageous embodiments of the invention can be extracted from the following description, the drawing, and the claims. Embodiments of the subject matter of the invention are represented in the drawing and explained in more detail below.

DESCRIPTION OF THE PREFFERED EMBODIMENT

Figure 1:
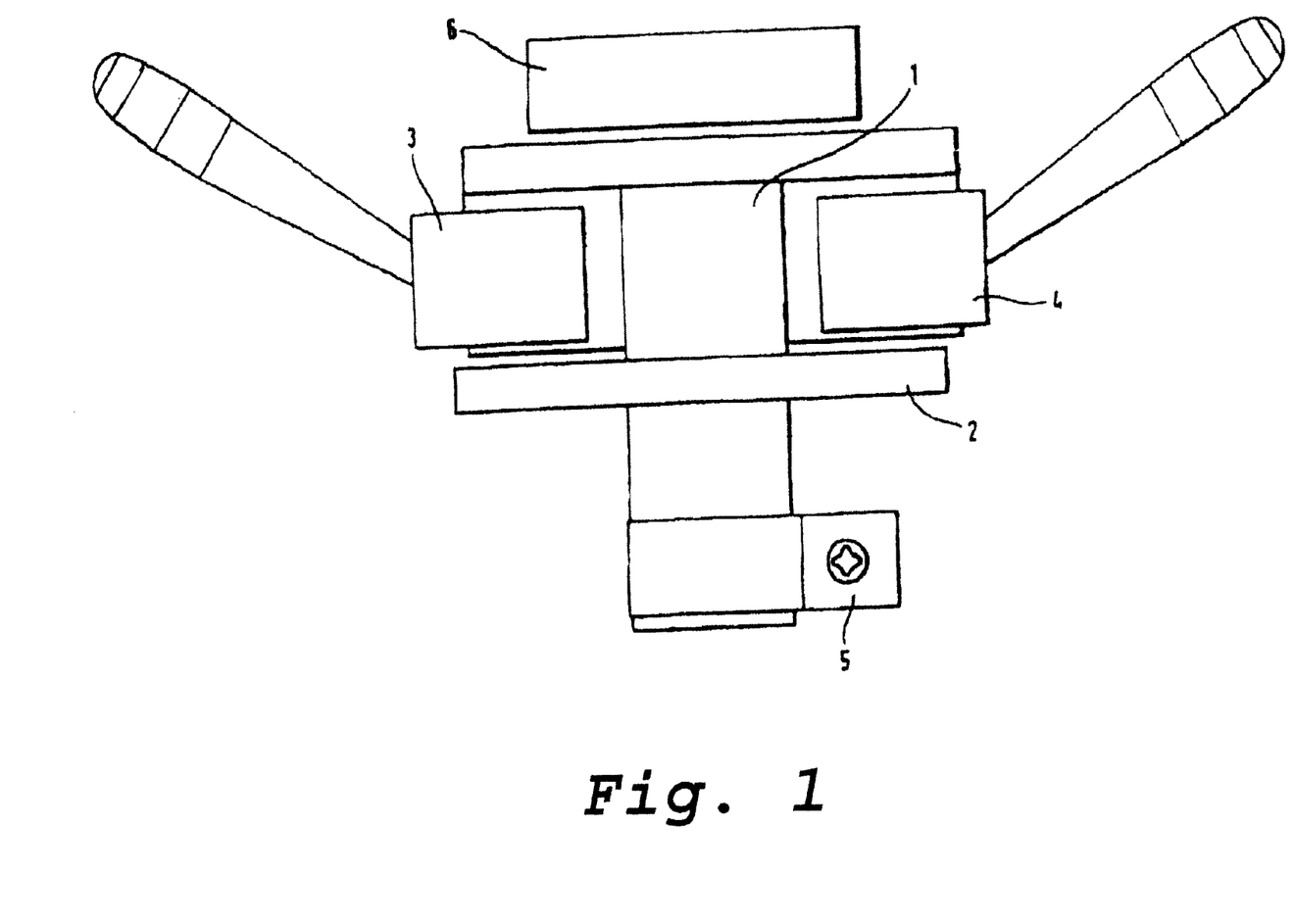
FIG. 1 shows a schematic side view of a compact steering column mounted switch consisting of six modules.
Figure 2:
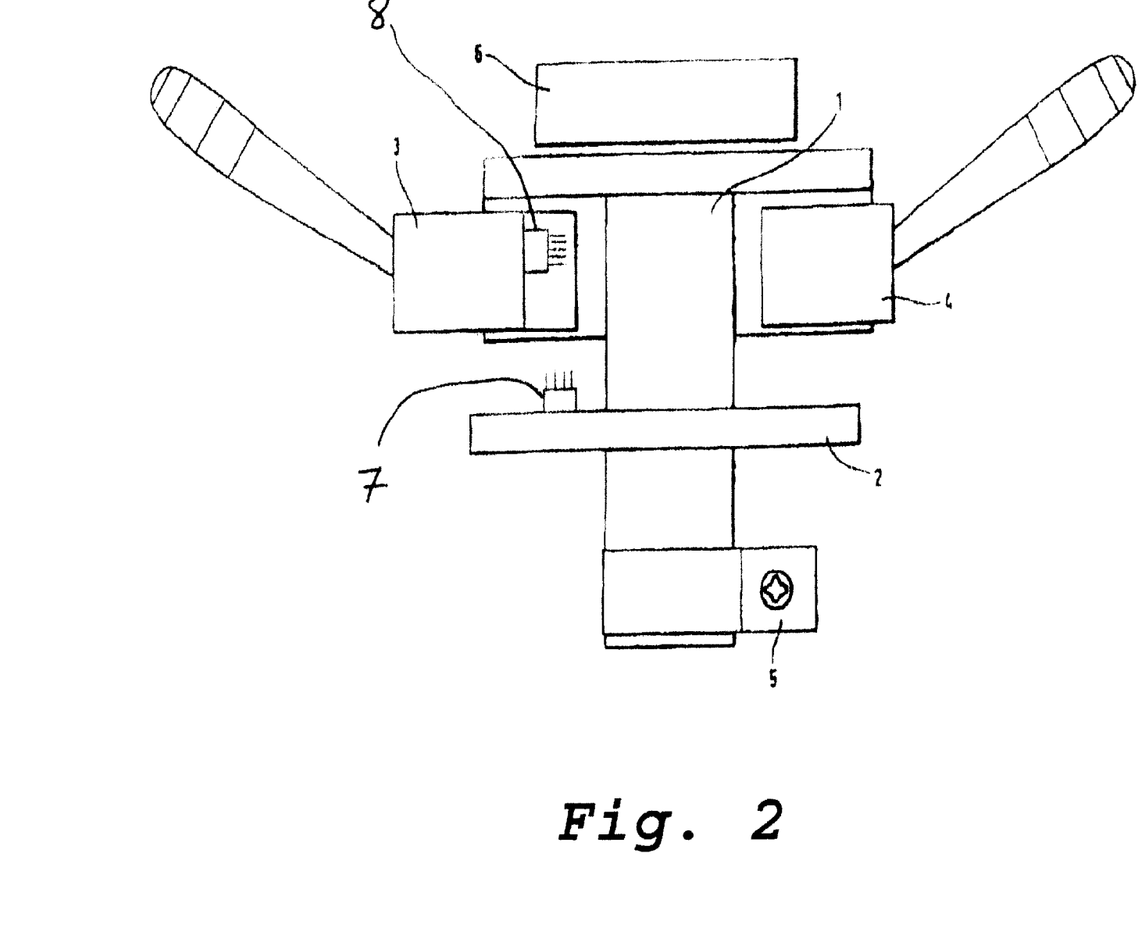
FIG. 2 shows the switch of FIG. 1 with two modules in a detached state.

The switch of FIGS. 1 and 2 comprises a receptacle 1 that defines internal interfaces 7, 8 among the operation modules 3, 4, steering angle sensor 6, and an electrical board 2. The electrical board 2 comprises all subassemblies necessary for switching current, distributing current, controlling current and for electronic control. Each operation module 3, 4 is a mechanically constructed functional group which serves to receive external signals mechanically and to transfer them to the electrical board 2. A mounting bracket 5 serves to fix the modular steering column mounted switch to the steering column of a motor vehicle. A steering angle sensor 6 serves to sense the current steering angle of the vehicle.

If, in vehicles of different manufacturers, identical technical functions but different designs are required of a steering column mounted switch, then the invention enables use of identical basic function modules such as the receptacle 1 and the electrical board 2 while facilitating exchange of operation modules that characterize design.

This is also possible for differing functions of individual operation modules 3, 4 or of the entire steering column mounted switch. If interfaces are defined in terms of mechanical and electrical function, corresponding individual functional modules may be combined with each other, independent of their function and of their constructive design, in accordance with functional and/or design demands.

A modular design of an overall system also simplifies repair. When a functional module is defective, the defect is eliminated through replacement of the module, without affecting the remaining components of the steering column mounted switch system.

Should increased complexity of functional requirements necessitate more complex mechanical and electrical interfaces, the operation modules 3, 4 and electrical board 2 can be furnished with additional interfaces 7, 8 that fit together with each other and which can then be exchanged.

If it is necessary to expand functions through use of an electronic controller for bus operation to control miscellaneous electronic functions, the electrical board 2 is exchanged for a board equipped with a controller.

In order to integrate a steering angle sensor 6 into a steering column mounted switch, the receptacle 1 and the electrical board 2 are modified to receive the sensor 6, while retaining the interfaces 7, 8 for the operation modules 3, 4. The sensor 6 is integrated but all other modules may then be used unchanged.

Figure 3:
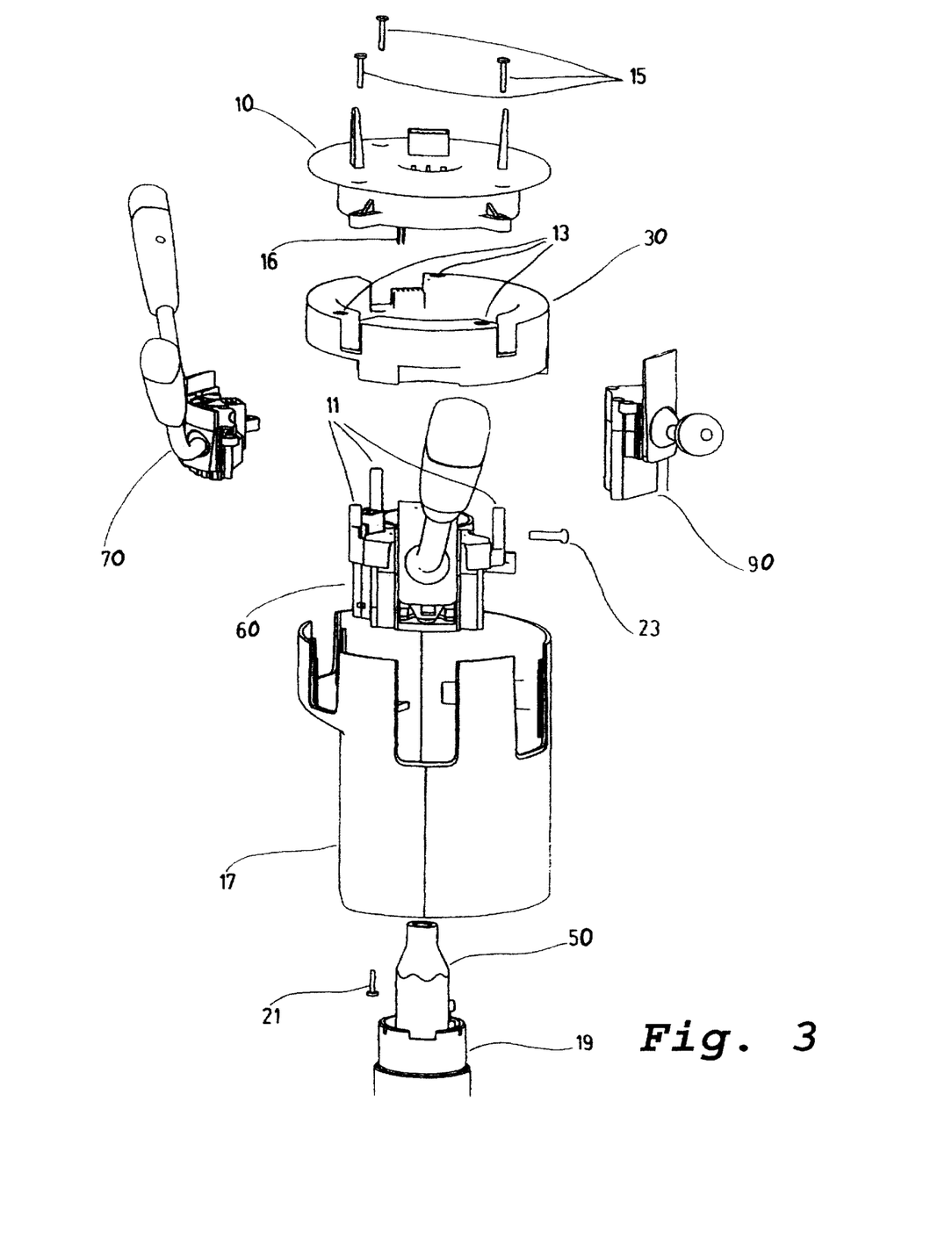
FIG. 3 shows an exploded view of a preferred embodiment of the inventive steering column module.

FIG. 3 shows an exploded view of a preferred embodiment of an inventive steering column module. A signal transmission case 10 serves for transmitting electrical signals from a steering wheel (not shown) to a steering column module and from there into the dashboard system of the vehicle. The signal transmission case 10 comprises i.a. one part which is fixed with respect to the steering column module, and one part which rotates with the steering wheel. The signal transmission case 10 contains a broad-band cable (not shown) which is shaped e.g. as a flat spiralled spring. This broad-band cable transmits information or electric currents from the steering wheel to the vehicle and vice versa. In modern vehicles, i.e. the horn, an airbag and the shifting of gears can all be actuated from the steering wheel.

A steering angle sensor 30 is provided below the signal transmission case 10. The steering angle sensor 30 determines, e.g. through optical scanning of a code disc (not shown), the steering angle of a steering column 50 and thereby the position of the steered wheels. The steering angle data can be encoded by a first evaluation electronics (not shown) into low or high-speed-CAN-bus data and transmitted to the vehicle where they can be used e.g. as input variable for a vehicle travel stabilization program.

A first steering column switch 60 serves e.g. for actuating the turn indicator, the light and the windscreen wipers. The first steering column switch 60 also bears the steering column module, in that the other components of the steering column module are connected thereto. Towards this end a second steering column switch 70 and a third steering column switch 90 are placed from the top over guides 11, designed as cylindrical pins. The steering angle sensor 30 is then pushed over the guides 11 via steering angle sensor 30 bores 13, whose diameter and separation match the guides 11. Finally, the signal transmission case 10 is located and the steering column module is fixed by screwing three screws 15 into threads (not shown) in the guides 11. The three screws 15 pass through corresponding bores in the signal transmission case 10 and the steering angle sensor 30.

A cover 17 protects the steering column module from external influences such as e.g. dust, provides the steering column module with a pleasant exterior/appearance, and also covers the steering column 50 and a tubular shell 19. The cover 17 is placed over the steering column module from below and is screwed to the steering column module using one or more screws 21. Since the steering column 50 is disposed in the tubular shell 19, concentricity tolerances in the steering column and/or the eccentricity of the steering column 50 with respect to the tubular shell 19 increase with increasing separation between the steering column 50 and the tubular shell 19.

The second and third steering column switch 70 and 90 can be used e.g. for controlling the vehicle speed and for special functions.

Mounting of the steering angle sensor 30 onto the guides 11 produces automatic contact of three plugs (not shown), between the steering angle sensor 30 and the corresponding plugs of the first, second and third steering column switches 60, 70 and 90. Mounting of the signal transmission case 10 onto the guides 11 automatically produces contact between a plug (not shown) of the signal transmission case 10 and a corresponding plug of the steering angle sensor 30.

A second evaluation electronics (not separately shown) is disposed close to the first evaluation electronics and receives or transmits signals via the contacts between the steering angle sensor 30 and the module components: namely the signal transmission case 10, the first, the second and the third steering column switches 60, 70 and 80. These signals are encoded or decoded by the second evaluation electronics into low- or high-speed-CAN-bus data and transmitted to or received by the vehicle. The signals transmitted or received by the first evaluation electronics and the signals transmitted or received by the second evaluation electronics are advantageously transmitted or received via an interface between the steering column module and vehicle.

A pin 16 projects in the axial direction past the signal transmission case 10, is connected to the rotary part of the signal transmission case 10, and engages in the code disc of the steering angle sensor 30 (not shown in FIG. 3). The pin 16 also represents the restoring cam for the turn indicator function of the first steering column switch 60.

The steering column module is detachably mounted in the vehicle. Towards this end, the steering column module is placed from the top over the tubular shell 19 of the vehicle and mounted to the tubular shell 19, via a mounting bracket disposed on the first steering column switch 60, with a screw 23.

Mounting of the steering column module in the vehicle automatically produces contact between the plug (not shown in FIG. 3) of the steering column module and the corresponding plug of the vehicle (also not shown in FIG. 3). This plug represents the above-mentioned interface between steering column module and vehicle.

Figure 4:
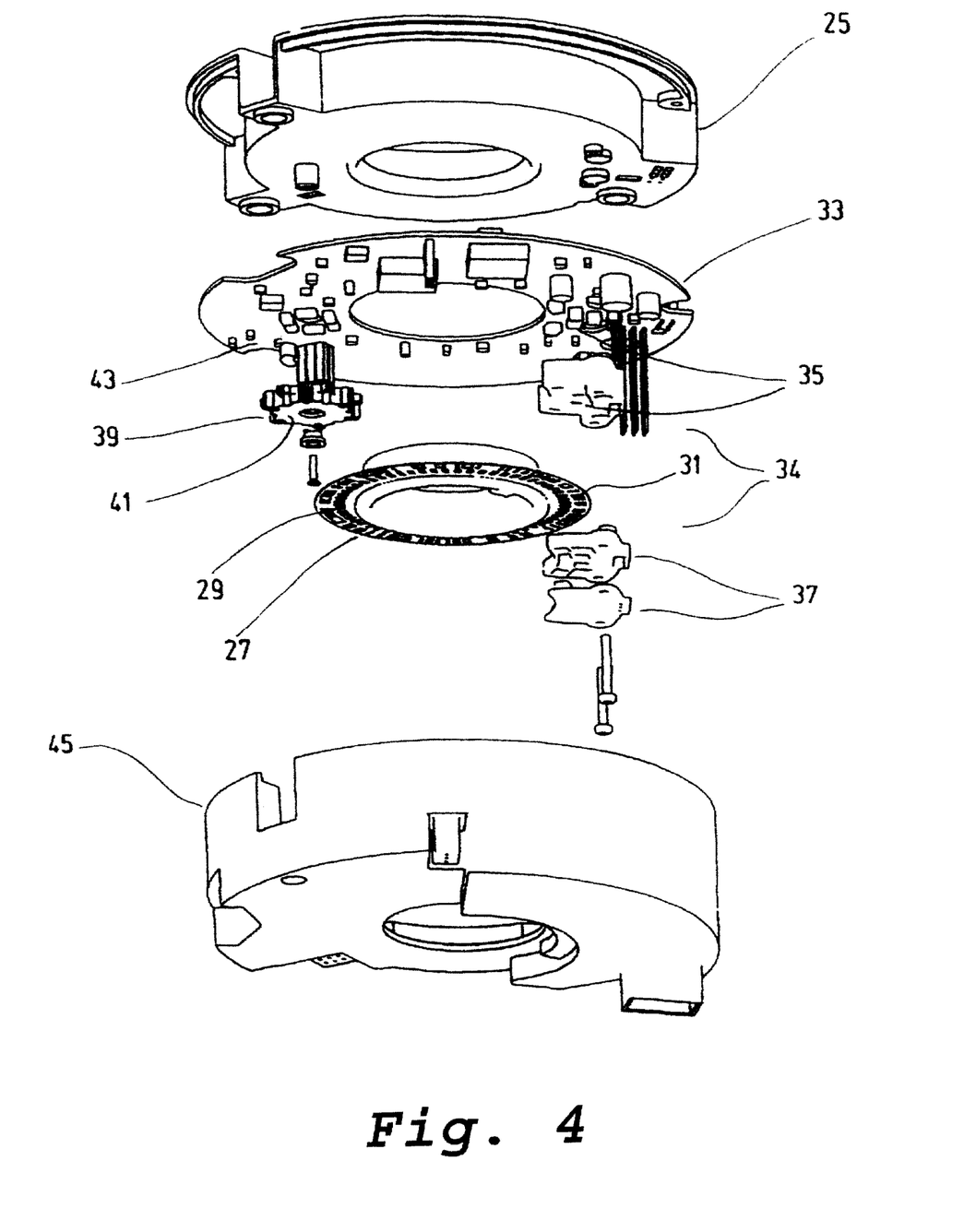
FIG. 4 shows an exploded view of a variation of the preferred embodiment having a steering angle sensor.

FIG. 4 shows an exploded view of the steering angle sensor 30. A code disc 27 which is rotatably mounted in the carrier 25 of the steering angle sensor 30 comprises an incremental track 29 and a code track 31. The code disc 27 is e.g. a perforated disc.

In the mounted state, the pin 16 shown in FIG. 3 engages a recess of the code disc 27 and thereby transmits the steering motion of the steering wheel to the code disc 27. The recess can be a slot extending in the radial direction which transfers the rotary motion of the pin 16 in the tangential direction without play and which compensates in the radial direction for concentricity errors of the steering column 50, of the signal transmission case 10 or of the steering wheel. As viewed in the direction of the longitudinal axis of the steering column, the code disc is disposed proximate to the bearing of the steering column in the tubular shell. This additionally improves the accuracy of the rotary angle measurement.

A printed circuit board 33 of the steering angle sensor 30 is provided with a scanning device 34 which consists substantially of a transmitter 35 with e.g. 4 light diodes and a receiver 37 with e.g. 4 transistors. In the assembled state, the transmitter 35 emits light through the holes of the code disc 27 to the receiver 37. The arrangement of the holes in the incremental track 29 and the code track 31 of the code disc 27 determine the steering angle throughout a steering wheel rotational range of 360°.

A revolution recognition means 39 determines the number of steering wheel revolutions. A toothed wheel 41 provided with a magnet is thereby carried along once per rotation by the code disc 27. 6 Hall elements 43 are provided below the toothed wheel 41, one of which is always switched. 6 Hall elements can thereby uniquely determine six steering wheel rotations. The first and second evaluation electronics are both located on the printed circuit board 33. Since the first and second evaluation electronics are shown without visible spatial separation, separate reference numerals have been omitted.

A casing 45 protects the steering angle sensor 30 from external influences.

Figure 5:
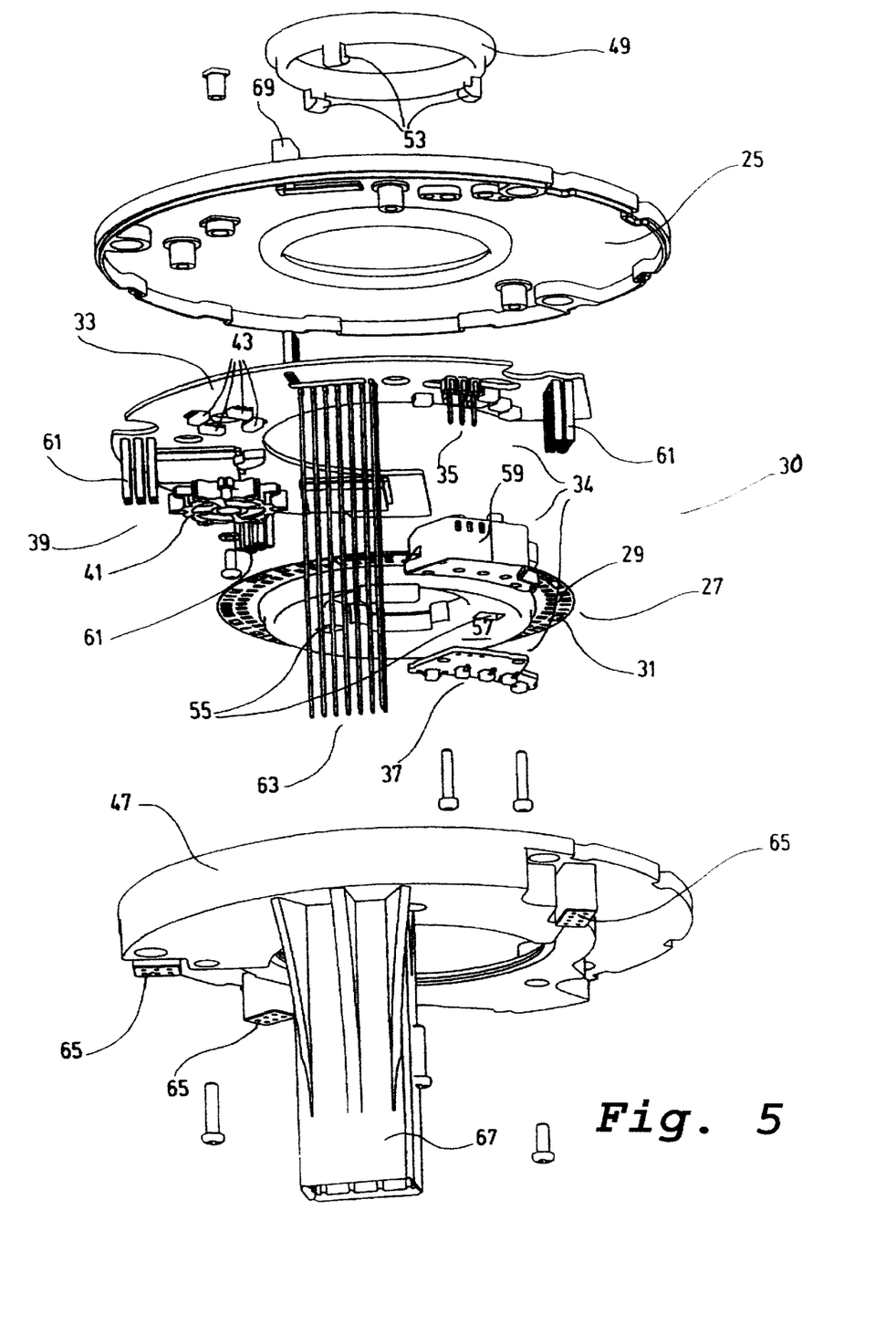
FIG. 5 shows an exploded view of a further variation of the inventive steering angle sensor.

FIG. 5 shows a further embodiment of an inventive steering angle sensor 30 in an exploded view. Corresponding features can be gathered from FIGS. 3 and 4 and their descriptions.

The code disc 27 is rotatably disposed in a casing 47 of the steering angle sensor 30. The mounting consists of a bearing ring 49 and a corresponding bore 51 in the casing 47. The bearing ring comprises three hook-shaped projections 53 which detachably or non-detachably lock in corresponding recesses 55 of the code disc 27 or of a bearing piece 57 when assembled.

The printed circuit board 33 is shown to have a scanning means 34 which consists substantially of a transmitter 35 with e.g. 5 light diodes and a receiver 37 with e.g. 5 transistors. A cover 59 is disposed between transmitter 35 and receiver 37 which keeps stray light away from the scanning means 34 and which bears the transmitter 35.

The revolution recognition means 39 comprises 4 Hall elements 43 one of which is always switched. The printed circuit board 33 is furthermore provided with plug pins 61 and 63. The plug pins 61 contact the first, second and third steering column switches 60, 70 and 90 when assembled, while the plug pins 63 provide contact between the steering column module and the vehicle.

The casing 45 is provided with plug casings 65 and 67 which receive the plug pins 61 and 63 in the assembled state of the steering angle sensor to obtain complete plug contact. The carrier 25 has a contact plug 69 which provides contact between the signal transmission case 10 and the steering angle sensor 30 when the steering angle sensor 30 is assembled.

Figure 6:
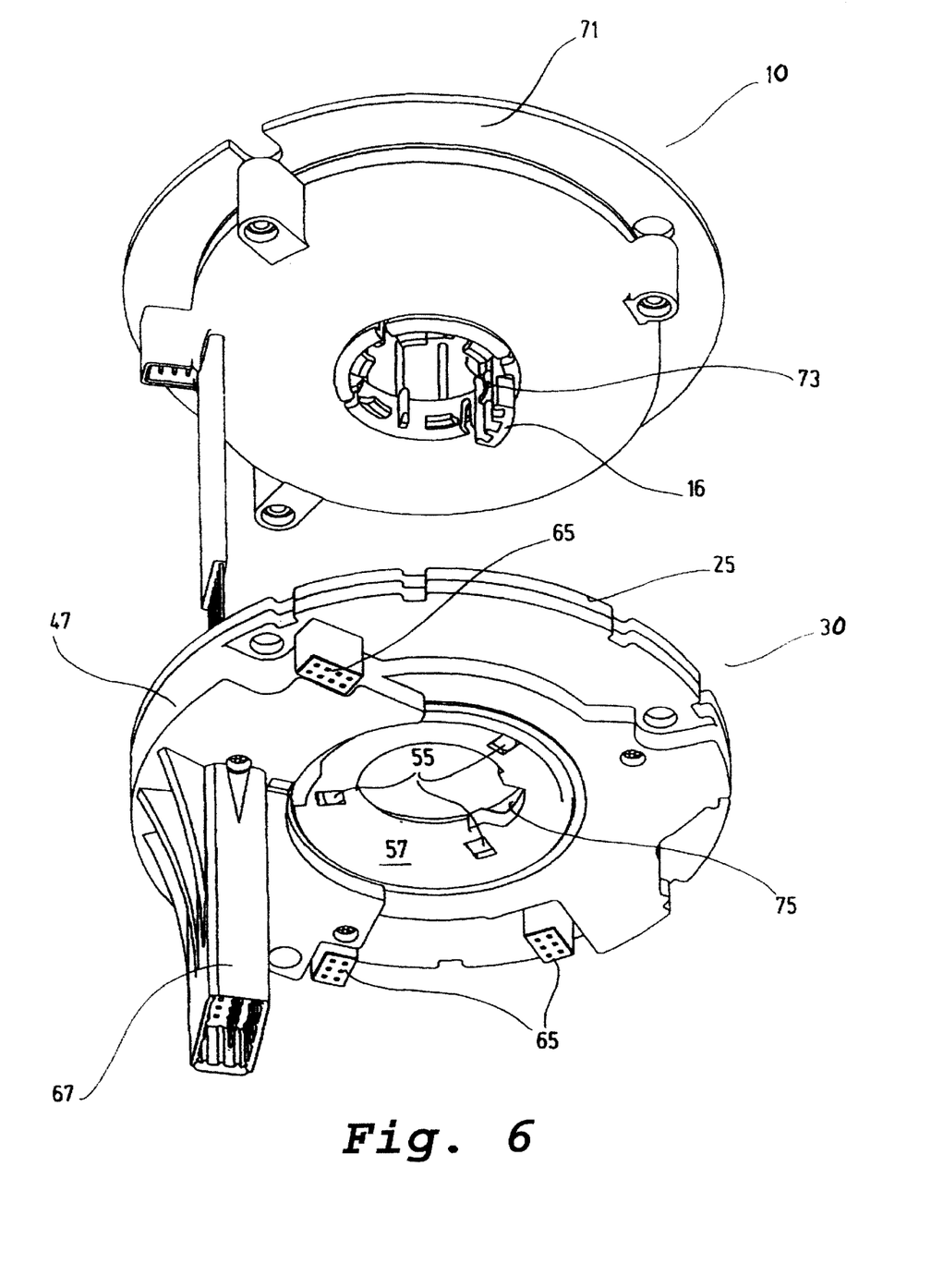
FIG. 6 shows an exploded view of the cooperation between steering angle sensor and signal transmission case.

FIG. 6 shows the signal transmission case 10 and the steering angle sensor 30. This representation shows the rotary part 71 of the signal transmission case 10. It is pushed with its bore 73 over the steering column (not shown in FIG. 6) and rotates along therewith. The pin 16 of the rotating part 71 engages in a recess 75 of the bearing piece 57 of the code disc 27 when the signal transmission case 10 is pushed onto the steering angle sensor 30 thereby effecting transmission of the steering motion between the signal transmission case 10 and the steering angle sensor 30, without play. The pin 16 can move in the radial and axial direction relative to the recess 73 of the code disc 27.

FIG. 6 also shows that the plug pins 77 produce the electric connection of the signal transmission case 10 to the steering angle sensor 30 and the vehicle, when assembled.

Figure 7:
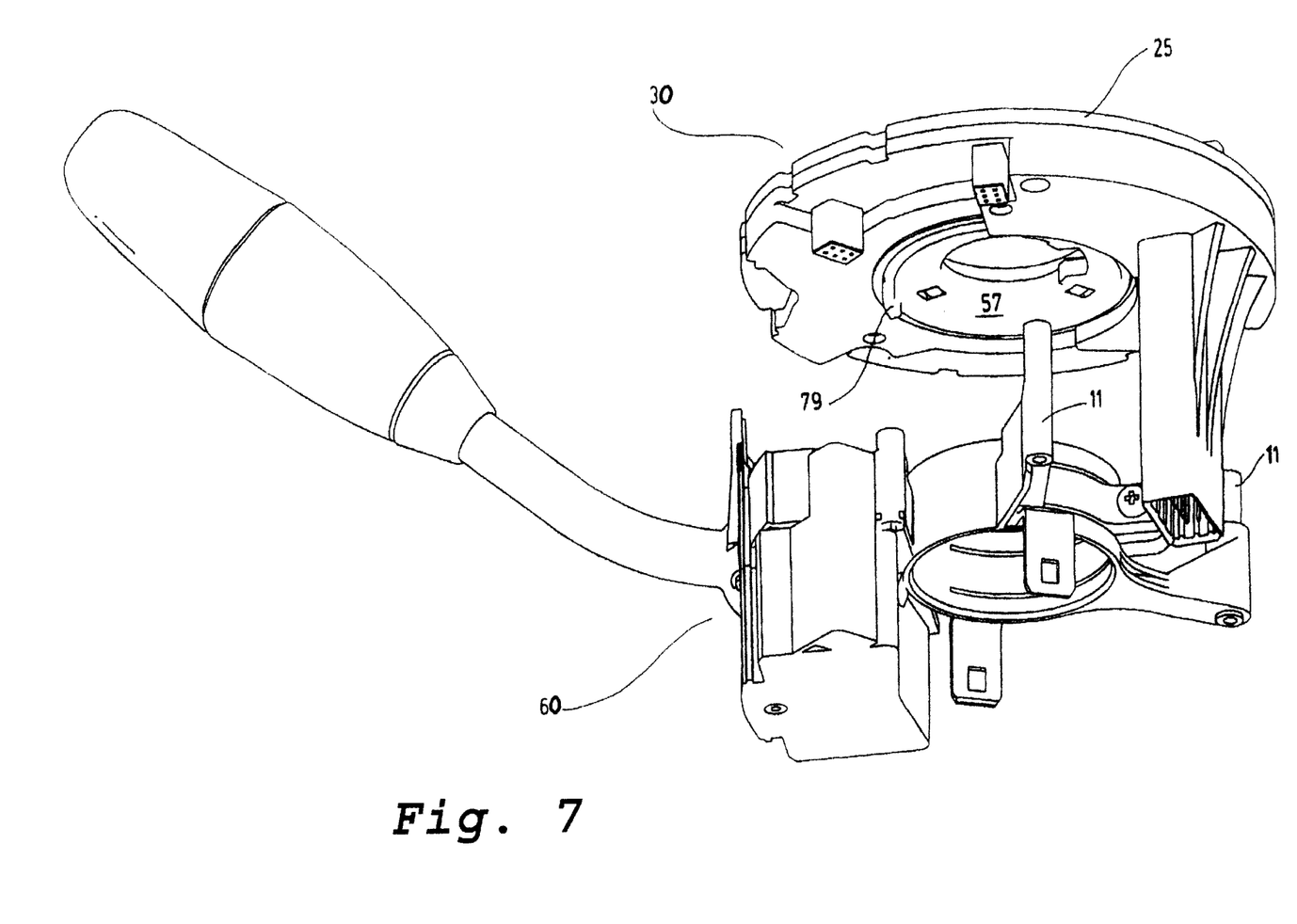
FIG. 7 shows an exploded view of the cooperation between steering angle sensor and steering column switch.

FIG. 7 shows the steering angle sensor 30 and the steering column switch 60 for actuating the blinkers. This figure illustrates the mounting of the code disc 27 in the carrier 25 via bearing ring 49 and bearing piece 57. The bearing piece comprises a pin 79 which projects towards the first steering column switch 60, past the code disc 27 and beyond the steering angle sensor 30. In the assembled state, the pin 79 actuates a restoring cam of the first steering column switch 60 (which is not shown in this representation) thereby restoring the first steering column switch and terminating blinker indication of the vehicle.

All the features shown in the description, in the following claims and in the drawing may be essential to the invention either individually or collectively in any arbitrary combination.

We claim:

1. A modular steering column mounted switch for a motor vehicle comprising:
at least one first module, said first module performing substantially mechanical functions only including at least one of reception of external signals, signal transfer and internal switching of contacts, said first module having a first module interface for electrical communication with said first module;
a second module, said second module performing substantially electrical functions only including at least one of current switching, current distribution and current control, said second module having a second module interface in electrical communication with said first module interface; and
means for mounting said first module and said second module to a steering column, wherein said mounting means, said first module, said first module interface, said second module, and said second module interface are structured for replacement and exchange of at least one of said first module and said second module, wherein said first module comprises a steering column switch and further comprising a signal transmission case for transmitting at least one of information and electric currents between a steering wheel and the vehicle, one steering angle sensor having a first evaluation electronics, and at least one second evaluation electronics for at least one of said signal transmission case and said steering column switch, wherein said first evaluation electronics and said second evaluation electronics are disposed in close proximity to each other.

2. The steering column mounted switch of claim 1, wherein said first evaluation electronics and said second evaluation electronics are disposed between said signal transmission case and said steering column switch.

3. The steering column mounted switch of claim 1, wherein said first evaluation electronics and said second evaluation electronics are integrated in said steering angle sensor.

4. The steering column mounted switch of claim 1, wherein said first evaluation electronics and said second evaluation electronics are disposed on a common printed circuit board.

5. The steering column mounted switch claim 1, wherein an electric plug connection is provided between said signal transmission case and said second evaluation electronics.

6. The steering column mounted switch of claim 1, wherein one electric plug connection is provided between each steering column switch and said second evaluation electronics.

7. The steering column mounted switch of claim 1, wherein a common electric plug connection is provided between each steering column switch and said second evaluation electronics.

8. The steering column mounted switch of claim 1, wherein said steering angle sensor is disposed between said signal transmission case and said steering column switch.

9. The steering column mounted switch of claim 1, wherein said signal transmission case comprises a part which can rotate with the steering wheel of the vehicle, wherein said steering angle sensor comprises a code disc which is rotatably disposed in said steering angle sensor, with said code disc being connected to said rotatable part of said signal transmission case for secure rotation therewith.

10. The steering column mounted switch of claim 1, wherein said first steering column switch serves for actuating a blinker and comprises an indicator restore or cancelling means which can be controlled by said steering angle sensor.

* * * * *